United States Patent [19]

Yoshimi et al.

[11] Patent Number: 5,726,215
[45] Date of Patent: Mar. 10, 1998

[54] STYRENE RESIN COMPOSITION AND SHAPED ARTICLE THEREOF

[75] Inventors: Shuji Yoshimi; Hayato Kihara; Takahiro Ishii, all of Chiba, Japan

[73] Assignee: Sumitomo Chemical Company, Limited, Osaka, Japan

[21] Appl. No.: 555,098

[22] Filed: Nov. 8, 1995

[30] Foreign Application Priority Data

Nov. 8, 1994 [JP] Japan .................... 6-273477

[51] Int. Cl.$^6$ .................................... C08L 23/02
[52] U.S. Cl. ................ 521/146; 521/79; 521/142; 521/147; 521/149; 525/191; 525/221; 525/222; 525/240; 525/241; 525/418; 525/451
[58] Field of Search ...................... 521/142, 146, 521/147, 149, 79; 525/418, 451, 191, 222, 221, 240, 241

[56] References Cited

FOREIGN PATENT DOCUMENTS

| 62-12812 | 3/1987 | Japan . |
|---|---|---|
| 62-34782 | 7/1987 | Japan . |
| 1-174550 | 7/1989 | Japan . |
| 3-157436 | 7/1991 | Japan . |
| 4-59847 | 2/1992 | Japan . |
| 4220439 | 8/1992 | Japan . |
| 5-186660 | 7/1993 | Japan . |
| 4089846 | 10/1993 | Japan . |

*Primary Examiner*—John M. Cooney, Jr.
*Attorney, Agent, or Firm*—Birch, Stewart, Kolasch & Birch,LLP

[57] ABSTRACT

A styrene resin composition is disclosed which constitutes 45 to 92% by weight of a styrene resin (A), 5 to 45% by weight of an olefin resin other than an ethylene-unsaturated carboxylic acid ester copolymer(B), and 3 to 25% by weight of an ethylene-unsaturated carboxylic acid ester copolymer (C). The styrene resin composition of the present invention may be used to make a variety of shaped articles which exhibit excellent mechanical properties, such as an impact strength, elongation at break and resistance against chemicals such as Freon and oil.

15 Claims, No Drawings

STYRENE RESIN COMPOSITION AND SHAPED ARTICLE THEREOF

FIELD OF THE INVENTION

The present invention relates to a styrene resin composition and shaped articles thereof. Particularly, the present invention relates to a styrene resin composition and shaped articles thereof having excellent mechanical properties such as an impact strength, an elongation at break and excellent resistance against chemicals such as Freon and oil.

BACKGROUND OF THE INVENTION

Styrene resins are widely used as materials for injection molding and sheet-molding because they have a rigidity and good dimension stability, and are produced with low cost. However, problems have arisen when using styrene resins in that directly contact oils and organic solvents such uses have been limited because of inferior resistance by styrene resins against oils and chemicals. Resin compositions composed of styrene resins and olefin resins were developed for improving chemical resistance and oil resistance. But such a resin composition had drawbacks, such as poor mechanical properties, e.g. impact strength, and elongation at break.

Further, as techniques for resolving these problems above, Japanese Patent Publication (Unexamined) Nos. Sho 62-12812 and Hei 3-157436 disclose a method that polystyrene-hydrogenated polybutadiene-polystyrene tri-block copolymer is used for a compatibilizing agent, and Japanese Patent Publication(Unexamined) No.Hei 1-174550 discloses a method that polystyrene-hydrogenated polyisoprene di-block copolymer is used.

However, these methods had drawbacks of which special block copolymer had to be used. Present inventors have extensively studied to resolving the problems above. As a result, present inventors achieved the present invention.

SUMMARY OF THE INVENTION

An object of the present invention is to provide a styrene resin composition comprising 45 to 92% by weight of a styrene resin (A), 5 to 45% by weight of an olefin resin other than an ethylene-unsaturated carboxylic acid ester copolymer (B), and 3 to 25% by weight of an ethylene-unsaturated carboxylic acid ester copolymer (C).

Another object of the present invention is to provide a shaped article of the styrene resin composition above injection-molded.

Another object of the present invention is to provide a shaped article of the styrene resin composition above extrusion-molded.

Another object of the present invention is to provide a shaped article formed by foaming the styrene resin composition above.

Other objects and advantages of the present invention will be apparent from descriptions below.

DETAILED DESCRIPTION OF THE INVENTION

As the styrene resin used in the present invention, there may be given a so-called wide use styrene resin, a rubber-modified styrene resin and a mixture therewith and the like. Here, the wide use styrene resin is one called GPPS (a general purpose polystyrene), and the rubber-modified styrene resin is produced by polymerizing a styrene monomer in the presence of a rubbery polymer and is called a high impact polystyrene.

As a styrene monomer, styrene is usually used, but alkyl-substituted styrenes such as α-methyl styrene, o-methyl styrene, p-methyl styrene, m-methyl styrene, 2,4-dichloro styrene, 2,5-dichloro styrene, may be used.

Olefin resins other than ethylene-unsaturated carboxy acid ester copolymers (herein-after, referred to simply as "olefin resin"), used in the present invention, include olefin homopolymers, olefin copolymers obtained by polymerizing a mixture of olefins copolymerizable each other, copolymers obtained by polymerizing an olefin and a vinyl monomer copolymerizable therewith and mixtures thereof.

As concrete Examples, there may be illustrated polyethylene, copolymers of ethylene with an α-olefin having 4 to 10 carbon atoms such as an ethylene-butene-1 copolymer, an ethylene-hexene-1 copolymer, copolymers of ethylene and a vinyl monomer such as an ethylene-vinyl acetate copolymer, a propylene polymer such as polypropylene, a propylene-ethylene block copolymer, and a propylene-ethylene random copolymer.

Among of these, polyethylene, copolymers of ethylene with an α-olefin having 4 to 10 carbon atoms such as an ethylene-butene-1 copolymer, an ethylene-hexene-1 copolymer, polypropylene, a propylene-ethylene block copolymer, and a propylene-ethylene random copolymer are preferable.

As concrete examples of unsaturated carboxylic acid ester moieties of the ethylene-unsaturated carboxylic acid ester copolymer (C) used in the present invention, there may be given ethyl acrylate, methyl acrylate, 2-ethyl hexyl acrylate, stearyl acrylate, methyl methacrylate, ethyl methacrylate, 2-ethyl hexyl methacrylate, stearyl methacrylate and the like.

As an ethylene-unsaturated carboxylic acid ester copolymer used in the invention, an ethylene-methyl methacrylate copolymer, an ethylene-ethyl methacrylate copolymer, an ethylene-ethyl acrylate copolymer, and an ethylene methyl acrylate copolymer are preferable. Among these, an ethylene-methyl methacrylate copolymer is the most preferable.

Contents of the ethylene and unsaturated carboxylic acid ester in the ethylene-unsaturated carboxylic acid ester copolymer are not particularly limited. But the content of ethylene is preferably within the range of 50 to 95% by weight, more preferably 55 to 70% by weight, and the content of the unsaturated carboxylic acid ester is preferably within the range of 5 to 50% by weight, more preferably 30 to 45% by weight.

Further, the type of copolymer of ethylene and unsaturated carboxylic acid ester may be a random type, a block type, an alternate type or the like and is not particularly restricted.

The melt flow rate of the ethylene-unsaturated carboxylic ester copolymer measured according to JIS K-6730 is not particularly restricted, but is preferably 1 to 500 g/10 minutes.

Amounts of the styrene resin (A), the olefin resin (B) and the ethylene-unsaturated carboxylic ester copolymer (C) used in the present invention are 45 to 92% by weight, preferably 50 to 85% by weight, 5 to 45% by weight, preferably 10 to 45% by weight and 3 to 25% by weight, preferably 5 to 20% by weight, respectively. The total amount of the component (A), (B) and (C) is 100% by weight.

A rigidity of the shaped article prepared from the resin composition becomes poor when the content of the styrene resin (A) is too small. On the other hand, the oil resistance and chemical resistance of the shaped article are inferior when the content of the styrene resin (A) is too large. The oil resistance and chemical resistance of the shaped article become poor when the content of the olefin resin (B) is too small. On the other hand, a rigidity of the shaped article is poor when the content of the olefin resin (B) is too large. The compatibility of the resin composition is poor, and impact resistance and elongation at break of the shaped article are inferior when the content of the ethylene-carboxylic acid ester copolymer (C) is too small. On the other hand, the rigidity of the shaped article becomes poor when the content of the olefin resin (C) is too large.

For obtaining the styrene resin composition of the present invention, the styrene resin (A), the olefin resin (B) and the ethylene-carboxylic acid ester copolymer (C) are mixed in predetermined amounts, and then the mixture is dry-blended with a mixing apparatus such as Henschel mixer or a tumbler. Alternatively, these components may be thoroughly heat-mixed at a temperature of 180° to 260° C. with a kneader such as a Banbury mixer, a single screw extruder, a double screw extruder or the like, and the resulting mixture pelletized.

Stabilizers or deterioration preventing agents used to protect against exposure to oxygen, heat and light, may be added. Such agents include inorganic fillers such as talc, calcium carbonate, mica for improving a rigidity of the shaped article, plasticizers such as a mineral oil, silicone oil for improving the fluidity of the composition, lubricants, flame retardants, coloring agents and the like, which are usually used in the plastic resin field. These agents may be added to the composition of the present invention so long as the excellent features of the present invention are not damaged.

The styrene resin composition of the present invention exhibits excellent mechanical properties, such as an impact strength, elongation at break, and resistance against chemicals such as Freon (trade name of a product manufactured by EI du Pont de Nemours & Co., Inc.) and oils. The composition can be widely used so as to make the best emplyment of these good properties. Particularly, the composition is suitably used for producing injection-molded articles and extrusion-molded articles.

Further, the styrene resin composition of the present invention is suitably used for producing foamed shaped articles.

The foamed shaped articles of the present invention are produced by the following methods for example.

In a first method, the pelletized styrene resin composition of the present invention is suspended in an aqueous dispersing medium in an autoclave and a volatile foaming agent is impregnated into the resin. In another method, a foaming agent and the styrene resin composition are kneaded sufficiently and the mixture is introduced into water through an orifice of a die end to obtain unfoamed pellets. The thus obtained resin pellets are molded to form a foamed article by a conventional foam molding machine.

According to the present invention, a styrene resin composition is provided which exhibits excellent mechanical properties such as an impact resistance, elongation at break, chemical resistance against chemicals such as Freon and oil resistance, as well as injection molded articles formed therefrom and extrusion molded articles formed therefrom.

EXAMPLE

The present invention will be explained by the following Examples, but the present invention is not limited thereto.

Data shown in Examples are measured by following methods.

(1) Izod impact strength (Impact resistance)

The test was conducted in accordance with JIS K 7110. A test piece with notch was 6.4 mm in thickness and measured at 23° C.

(2) Elongation at break

The test was conducted in accordance with ASTM D638. A test piece of No.1 was used and the stretching speed was 5 mm/minute.

(3) Heat distortion temperature (HDT)

The test was conducted in accordance with JIS K 7202. A fiber stress was 18.6 kgf/cm$^2$ and the test piece was not annealed.

(4) Oil resistance

The resin composition was pre-heated at 250° C. for 5 minutes, then was molded into a pressed sheet having a size of 150 mm×150 mm×3 mm under a pressure of 50 kg/cm$^2$ for 5 minutes, and was cut thereby preparing a test piece of 20 mm×150 mm×3 mm for a measurement.

A measurement of oil resistance was conducted by the following method: One end of the test piece was fixed with a device and the other end was kept in a state of strain of 10 mm. The test piece was coated with a margarine (manufactured by Snow Brand Milk Products Co., Ltd. trade name: Neosoft) , and stood for 24 hours at room temperature. The oil resistance was evaluated by observing the existence of stress cracking caused on the surface of the test piece.

○ Stress crack was not observed.

X Stress crack was observed.

(5) Chemical resistance (Freon resistance)

The resin composition was pre-heated at 250° C. for 5 minutes, then was molded into a pressed sheet having a size of 150 mm×150 mm×3 mm under a pressure of 50 kg/cm$^2$ for 5 minutes, and was cut thereby preparing test pieces of 20 mm×150 mm×3 mm for a measurement. A measurement of chemical resistance was conducted by the following method: One end of a test piece was fixed with a device and the other end was kept in a state of strain of 10 mm. The test piece together with the device was allowed to stand in a decicator having a volume of about 10 liters and HLC-141b (Freon manufactured by Asahi Glass Co., Ltd. trade name: Asahiclean AK-141b) was simultaneously enclosed in the decicator. One atmosphere of Freon vapor was maintained in the decicater for 24 hours. Chemical resistance was evaluated by observing the existence of stress cracking caused on the surface of the test piece.

○ Stress crack was not observed.

X Stress crack was observed.

(6) Melt flow rate

A measurement was conducted in accordance of JIS K7210 at 200° C. under a load of 5 kgf.

Examples 1 to 4 and Comparative Examples 1 to 3

Components shown in Table 1 were melted at 220° C. using a double screw extruder (Toyo Seiki Seisakusho Co., Type 2S25), and were pelletized to obtain test samples for evaluation. Results are shown in the Table 1.

TABLE 1

| | Example | | | |
|---|---|---|---|---|
| | 1 | 2 | 3 | 4 |
| Components (wt %) | | | | |
| (A)Kind*¹ | A1 | A1 | A1 | A2 |
| Amount | 50 | 50 | 50 | 83 |
| (B)Kind*² | B1 | B1 | B2 | B1 |
| Amount | 30 | 40 | 40 | 10 |
| (C)Kind*³ | C1 | C1 | C1 | C1 |
| Amount | 20 | 10 | 10 | 7 |
| Evaluation | | | | |
| Izod impact strength kgf·cm/cm² | 23.7 | 17.5 | 7.0 | 21.3 |
| Elongation at break % | 39 | 49 | 42 | 88 |
| HDT °C. | 71 | 74 | 78 | 80 |
| Oil resistance | ○ | ○ | ○ | ○ |
| Freon resistance | ○ | ○ | ○ | ○ |
| MFR g/10 min. | 10.1 | 6.6 | 5.4 | 5.7 |

| | Comparative Example | | |
|---|---|---|---|
| | 1 | 2 | 3 |
| Components (wt %) | | | |
| (A)Kind*¹ | A1 | A1 | A1 |
| Amount | 100 | 55 | 55 |
| (B)Kind*² | — | B1 | B2 |
| Amount | — | 45 | 45 |
| (C)Kind*³ | — | — | — |
| Amount | — | — | — |
| Evaluation | | | |
| Izod impact strength kgf·cm/cm² | 7.4 | 4.3 | 2.0 |
| Elongation at break % | 50 | 26 | 10 |
| HDT °C. | 80 | 78 | 83 |
| Oil resistance | X | ○ | ○ |
| Freon resistance | X | ○ | ○ |
| MFR g/10 min. | 3.2 | 4.2 | 5.1 |

*¹Component (A)
A1: A styrene resin (manufactured by Sumitomo Chemical Company, Limited. Trade name: Sumibrite M583, MFR: 3 g/10 min. Density: 1.05 g/cm³)
A2: A styrene resin (manufactured by Sumitomo Chemical Company, Limited. Trade name: Sumibrite TL3000, MFR: 4 g/10 min., Density: 1.05 g/cm³.)
*²Component (B)
B1: Low density polyethylene(manufactured by Sumitomo Chemical Company, Limited. Trade name: Sumikathene FZ103-0, MFR: 0.8 g/10 min. Density: 0.925 g/cm³)
B2: Polypropylene (manufactured by Sumitomo Chemical Company, Limited. Trade name: Sumitomo Noblen AD571, MFR: 0.5 g/10 min. Density: 0.90 g/cm³)
*³component (C)
C1: Ethylene-methyl methacrylate copolymer (manufactured by Sumitomo Chemical Company, Limited. Trade name: Acryft CM4011, Content of methyl methacrylate: 38% by weight, MFR: 15 g/10 min.)

As is evident from the results shown in Table 1, Examples 1–4 according to the present invention exhibit an improved balance of measured physical properties against Comparative Examples 1–3.

What is claimed is:

1. A styrene resin composition comprising 45 to 92% by weight of a styrene resin (A), 5 to 45% by weight of an olefin resin other than an ethylene-unsaturated carboxylic acid ester copolymer (B) and 3 to 25% by weight of an ethylene-unsaturated carboxylic acid ester copolymer (C), wherein said ethylene-unsaturated carboxylic acid ester copolymer (C) is a member selected from the group consisting of ethylene-methyl methacrylate copolymer, ethylene-ethyl methacrylate copolymer, ethylene-methyl acrylate copolymer, and ethylene-ethyl acrylate copolymer.

2. The styrene resin composition according to claim 1, wherein said olefin resin is a member selected from the group consisting of polyethylene, a copolymer of ethylene and an α-olefin having 4 to 10 carbon atoms, an ethylene-vinyl acetate copolymer, polypropylene, a propylene-ethylene block copolymer, and propylene-ethylene random copolymer.

3. The styrene resin composition according to claim 2, wherein the olefin resin is a member selected from the group consisting of polyethylene, ethylene-butene-1 copolymer, ethylene-hexene-1 copolymer, polypropylene, a propylene-ethylene block copolymer and propylene-ethylene random copolymer.

4. The styrene resin composition according to claim 1, wherein contents of components (A), (B) and (C) are 50 to 80% by weight, 15 to 45% by weight, and 5 to 20% by weight, respectively.

5. The styrene resin composition according to claim 1, wherein said ethylene-unsaturated carboxylic acid ester copolymer is ethylene-methyl methacrylate copolymer.

6. The styrene resin composition according to claim 1, wherein said ethylene-unsaturated carboxylic acid ester copolymer contains 50 to 95% by weight of an ethylene unit and 5 to 50% by weight of an unsaturated carboxylic acid ester unit.

7. The styrene resin composition according to claim 6, wherein said ethylene-unsaturated carboxylic acid ester copolymer contains 55 to 70% by weight of an ethylene unit and 30 to 45% by weight of an unsaturated carboxylic acid ester unit.

8. The styrene resin composition according to claim 5, wherein said ethylene-unsaturated carboxylic add ester copolymer contains 50 to 95% by weight of an ethylene unit and 5 to 50% by weight of an unsaturated carboxylic acid ester unit.

9. An injection-molded article prepared by injection-molding the styrene resin composition defined in claim 1.

10. An extrusion-molded article prepared by extrusion-molding the styrene resin composition defined in claim 1.

11. A foamed shaped article made of the styrene resin composition defined in claim 1.

12. A styrene composition consisting essentially of 45 to 92% by weight of a styrene resin (A), 5 to 45% by weight of an olefin resin other than an ethylene-unsaturated carboxylic acid ester copolymer (B) and 3 to 25% by weight of an ethylene-unsaturated carboxylic acid ester copolymer (C), wherein said ethylene-unsaturated carboxylic acid ester copolymer (C) is a member selected from the group consisting of ethylene-methyl methacrylate copolymer, ethylene-ethyl methacrylate copolymer, ethylene-methyl acrylate copolymer, and ethylene-ethyl acrylate copolymer.

13. An injection-molded article prepared by injection-molding the styrene resin composition defined in claim 12.

14. An extrusion-molded article prepared by extrusion-molding the styrene resin composition defined in claim 12.

15. A foamed shaped article made of the styrene resin composition defined in claim 12.

* * * * *